(12) United States Patent
Thomas et al.

(10) Patent No.: US 6,575,085 B2
(45) Date of Patent: Jun. 10, 2003

(54) PEELING APPARATUS WITH ENHANCED ABRASIVE ROLLERS AND ASSOCIATED METHODS

(75) Inventors: Donald C. Thomas, Lakeland, FL (US); Gregory W. Schrader, Lakeland, FL (US); Michael L. Suter, Spring Hill, FL (US)

(73) Assignee: FMC Technologies, Inc., Chicago, IL (US)

( * ) Notice: Subject to any disclaimer, the term of this patent is extended or adjusted under 35 U.S.C. 154(b) by 90 days.

(21) Appl. No.: 09/842,263

(22) Filed: Apr. 25, 2001

(65) Prior Publication Data

US 2001/0046541 A1 Nov. 29, 2001

Related U.S. Application Data

(63) Continuation-in-part of application No. 09/576,924, filed on May 23, 2000.

(51) Int. Cl.[7] ................................................. A23N 7/02
(52) U.S. Cl. .............................. 99/625; 99/628; 99/629
(58) Field of Search ........................ 99/625, 624, 628, 99/623, 626, 629; 15/3.11, 3.13, 3.14, 3.19, 3.2, 3.21; 134/65, 132, 133, 134

(56) References Cited

U.S. PATENT DOCUMENTS

| | | | |
|---|---|---|---|
| 2,139,180 A | | 12/1938 | Urschel ........................ 146/49 |
| 2,605,798 A | | 8/1952 | Boswell |
| 2,776,690 A | * | 1/1957 | Warren .......................... 99/625 |
| 3,745,914 A | | 7/1973 | Wallace ........................ 99/630 |
| 4,237,782 A | * | 12/1980 | Bichel .......................... 99/625 |
| 4,519,305 A | | 5/1985 | Vanosdall ...................... 99/625 |
| 4,827,836 A | * | 5/1989 | Neidigh ........................ 99/625 |
| 5,780,088 A | * | 7/1998 | Zittel et al. ............... 99/623 X |
| 5,858,429 A | | 1/1999 | Wallace ........................ 426/231 |
| 5,989,614 A | | 11/1999 | Zittel .......................... 426/481 |

FOREIGN PATENT DOCUMENTS

| | | |
|---|---|---|
| DE | 161 518 | 6/1904 |
| DE | 10 23 952 | 2/1958 |
| FR | 2 062 400 | 6/1971 |
| GB | 928745 | 6/1963 |

\* cited by examiner

Primary Examiner—Reginald L. Alexander
(74) Attorney, Agent, or Firm—Allen, Dyer, Doppelt, Milbrath & Gilchrist, P.A.

(57) ABSTRACT

A peeling apparatus includes a frame, and at least one set of abrasive rollers carried by the frame to define at least one peeling chamber. Each abrasive roller includes an elongate body portion having an abrasive outer surface and may have a pair of mounting stubs permanently affixed to respective opposing ends of the elongate body portion. The elongate body portion and the pair of mounting stubs may each comprise metal, and the pair of mounting stubs may be welded to respective ends of the elongate body portion to provide the permanent fixation. The abrasive outer surface may include a plurality of knurls arranged in a pattern. Each knurl may also comprise a leading edge portion being steeper than a trailing edge portion.

23 Claims, 8 Drawing Sheets

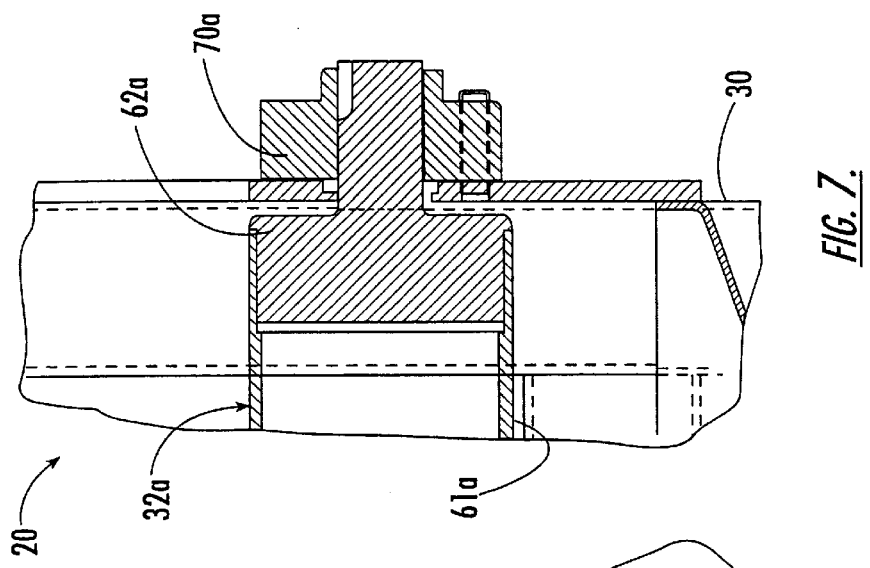
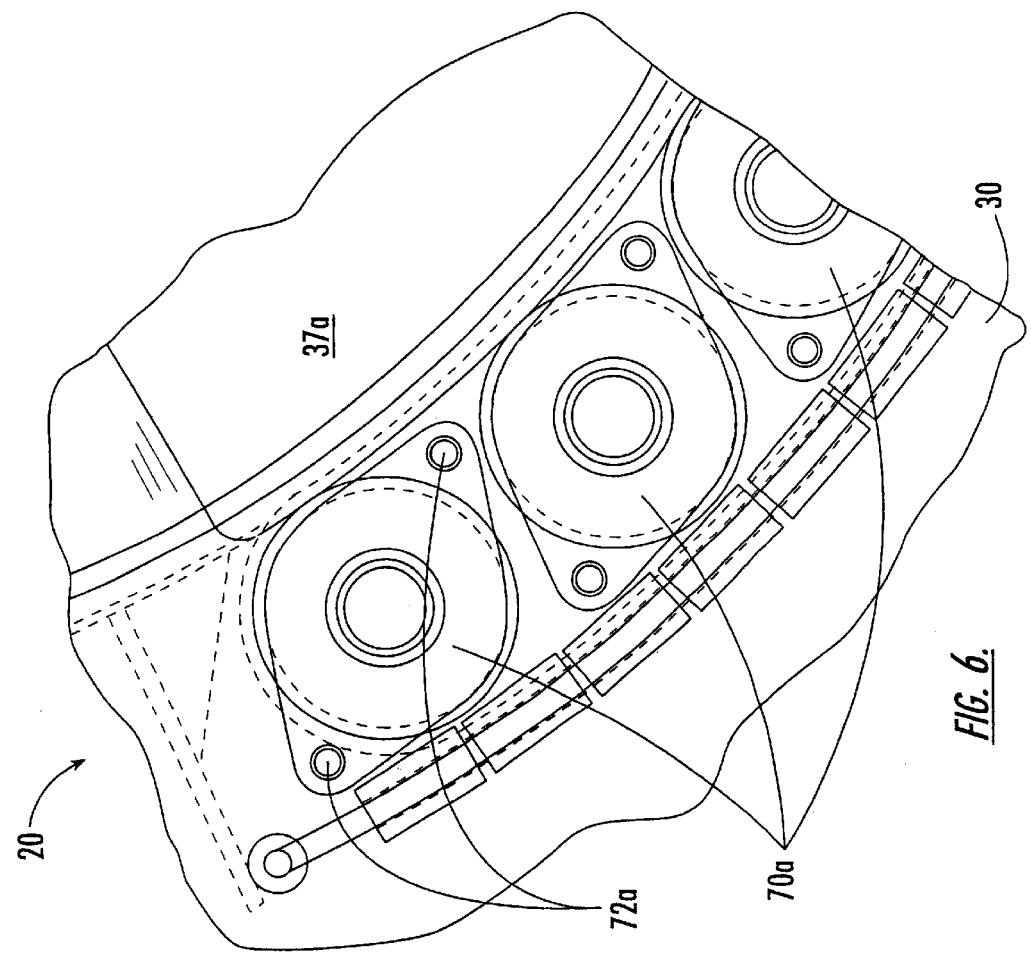

PEELING APPARATUS WITH ENHANCED ABRASIVE ROLLERS AND ASSOCIATED METHODS

RELATED APPLICATION

The present application is a continuation-in-part of U.S. patent application Ser. No. 09/576,924 filed on May 23, 2000, the entire disclosure of which is incorporated herein by reference.

FIELD OF THE INVENTION

This invention relates to the field of food processing, and more particularly, to apparatus and methods for peeling vegetables and fruits.

BACKGROUND OF THE INVENTION

It is common in many food processing applications to require the peeling of the outer skin of fruits or vegetables. Potatoes, in particular, are very often so processed by passing the potatoes against a set of rotating abrasive rollers. Fruit may also be similarly processed. For example, U.S. Pat. No. 2,605,798 to Boswell discloses a citrus fruit peeler including a pair of abrading rollers and an auger screw which advances the citrus along the rollers.

Along these lines, U.S. Pat. No. 3,745,914 to Wallace discloses a single chamber fruit and vegetable peeler including a frame, a plurality of abrasive roller carried by the frame and arranged in an arcuate pattern, and a drive motor and gears coupled to the rollers. The abrasive rollers are provided in lengthwise segments to facilitate replacement of a damaged section without requiring replacement of an entire roller. Action of the rollers advances the fruit or vegetables from an inlet to a discharge. A rinsing system is provided to wash material from the rollers. The vegetables or fruit are subjected to a tumbling action within the peeling chamber. The amount of peeling is controlled by a height of a gate at the discharge.

U.S. Pat. No. 4,519,305 to Vanosdall discloses a similar apparatus wherein an auger extends only partway into the chamber from the discharge. U.S. Pat. No. 5,858,429 also to Wallace discloses a similar apparatus which includes an auger at a feed hopper, and a rotatable tumbler including rotating paddles within the peeling chamber. This patent also discloses a vision analysis system to evaluate the degree of peeling and adjust the various parameters to provide a desired degree of peeling.

U.S. Pat. Nos. 4,237,782 to Bichel and 4,827,836 to Neidigh disclose peeling apparatus wherein the abrasive rollers are driven by individual hydraulic motors. U.S. Pat. No. 5,780,088 to Zittel discloses a peeler that includes individual electric motors to drive each roller. The rollers can be operated at different speeds or in different directions. An auger which extends through the peeling chamber, may also be controlled by an electric motor.

To increase capacity, a dual peeling or washing chamber apparatus was offered by Vanmark Corporation under the model designation Series 2800. The apparatus included two side-by-side chambers wherein the auger screws rotated in a same direction. Accordingly, the abrasive rollers and their associated motors extended around an arc further upward on a same side.

The abrasive rollers typically used for peeling may include removable end shafts which permit removal of the roller for maintenance. Unfortunately, this construction may permit a relatively large degree of motion at the ends of the rollers, thereby causing vibration and limiting higher rotational speed.

Also, the abrasive rollers commonly used for peeling may include a metal surface with a pattern of indentations and protrusions formed therein, or may include sand or other abrasives impregnated in a matrix. Such abrasive surfaces may not provide uniform abrasion, may not wear uniformly, and/or provide sufficient service life.

SUMMARY OF THE INVENTION

In view of the foregoing background, it is therefore an object of the invention to provide a peeling apparatus and associated methods including abrasive rollers which are less likely to experience vibration and/or which may last longer in service.

These and other objects, features and advantages in accordance with the present invention are provided by a peeling apparatus which in one embodiment includes a frame, and at least one set of abrasive rollers carried by the frame to define at least one peeling chamber, and wherein at least one abrasive roller comprises an elongate body portion having an abrasive outer surface and a pair of mounting stubs permanently affixed to respective opposing ends of the elongate body portion. This arrangement of the mounting stubs permits greater precision and balancing, and thereby permits higher rotational speeds.

The elongate body portion and the pair of mounting stubs may each comprise metal. Accordingly, the pair of mounting stubs may be welded to respective ends of the elongate body portion to provide the permanent fixation.

The elongate body portion may have a tubular shape, and the abrasive outer surface may comprise a plurality of knurls arranged in a pattern. In some embodiments, at least some of the knurls may comprise a leading edge portion being steeper than a trailing edge portion. Accordingly, greater strength may be provided to reduce wear and thereby increase service life. This particularly advantageous feature of the knurl shape may be used with or independently of the permanently fixed mounting stubs.

At least some of the knurls may have a substantially same shape. The knurls may be integrally formed with the elongate body portion. In other words, the knurls may be formed into or from outer surface portions of the elongate body portion. For additional service life, a surface coating may be applied over the knurls. For example, the surface coating may comprise at least one of cobalt, chromium, tungsten, and nickel, or any other suitable coating. The elongate body portion may comprise at least one of steel and aluminum.

One method aspect of the invention is for making an abrasive roller for a peeling apparatus of a type comprising a frame, and at least one set of abrasive rollers carried by the frame to define at least one peeling chamber. The method preferably comprises providing an elongate body portion, and permanently affixing a pair of mounting stubs to respective opposing ends of the elongate body portion. The elongate body portion and the pair of mounting stubs may each comprise metal, and permanently affixing may comprise welding the metal components together.

Another method aspect of the invention is also for making an abrasive roller for a peeling apparatus including a frame, and at least one set of abrasive rollers carried by the frame. The method may comprise providing an elongate body portion comprising comprising at least one of steel and aluminum, forming a plurality of knurls on the elongate body portion in a pattern defining an abrasive outer surface, and forming an outer coating on the abrasive surface, wherein the coating comprises at least one of cobalt, chromium, tungsten, and nickel.

Yet another method aspect of the invention is also for making an abrasive roller for a peeling apparatus of a type comprising a frame, and at least one set of abrasive rollers carried by the frame to define at least one peeling chamber. The method preferably comprises providing an elongate body portion; and forming a plurality of knurls on the elongate body portion to define an abrasive surface, with at least some of these knurls having a leading edge portion being steeper than a trailing edge portion.

BRIEF DESCRIPTION OF THE DRAWINGS

FIG. 6 is an enlarged end view of a discharge portion of the peeling apparatus of FIG. 1 illustrating the flange bearings supporting the discharge ends of the abrasive rollers.

FIG. 7 is an enlarged cross-sectional view of the discharge end of a abrasive roller and its associated flange bearing as used in the peeling apparatus of FIG. 1.

DETAILED DESCRIPTION OF THE PREFERRED EMBODIMENTS

Figure 1:
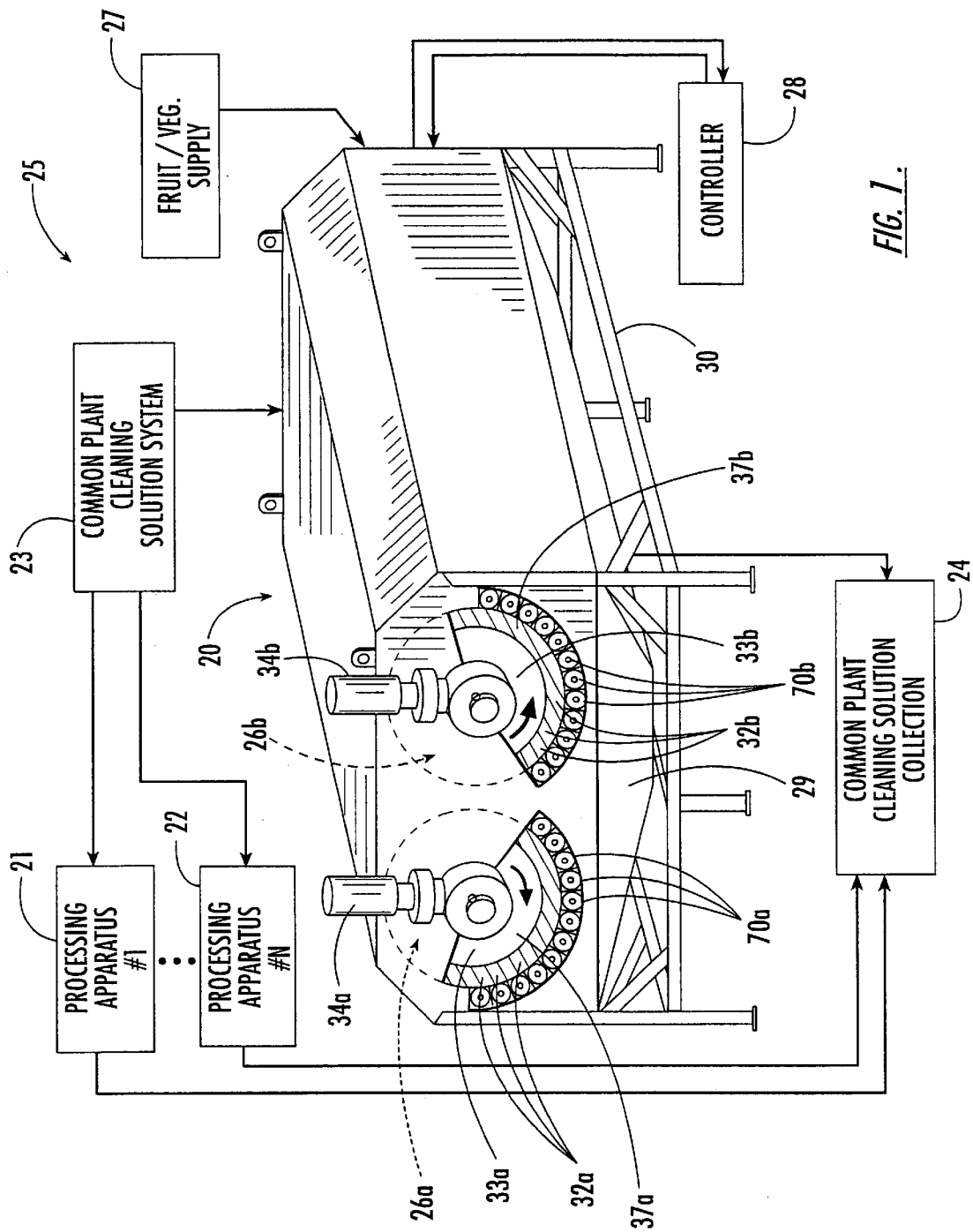
FIG. 1 is a perspective view of a peeling apparatus in accordance with the invention.

The present invention will now be described more fully hereinafter with reference to the accompanying drawings in which preferred embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

Referring initially to FIGS. 1–4 the peeling apparatus 20 in accordance with the present invention is now described. The peeling apparatus 20 may be part of an overall fruit or vegetable processing system 25 that may include other processing apparatus 21, 22 as schematically illustrated. In addition, these other processing apparatus 21, 22 may also be connected to a common plant cleaning solution system 23 including a cleaning solution supply and associated interconnecting piping. Similarly, these other processing apparatus 21, 22 may also be connected to a common plant cleaning solution collection system 24 including a drain, sump or collection vessel and interconnecting piping as will be appreciated by those skilled in the art.

Figure 4:
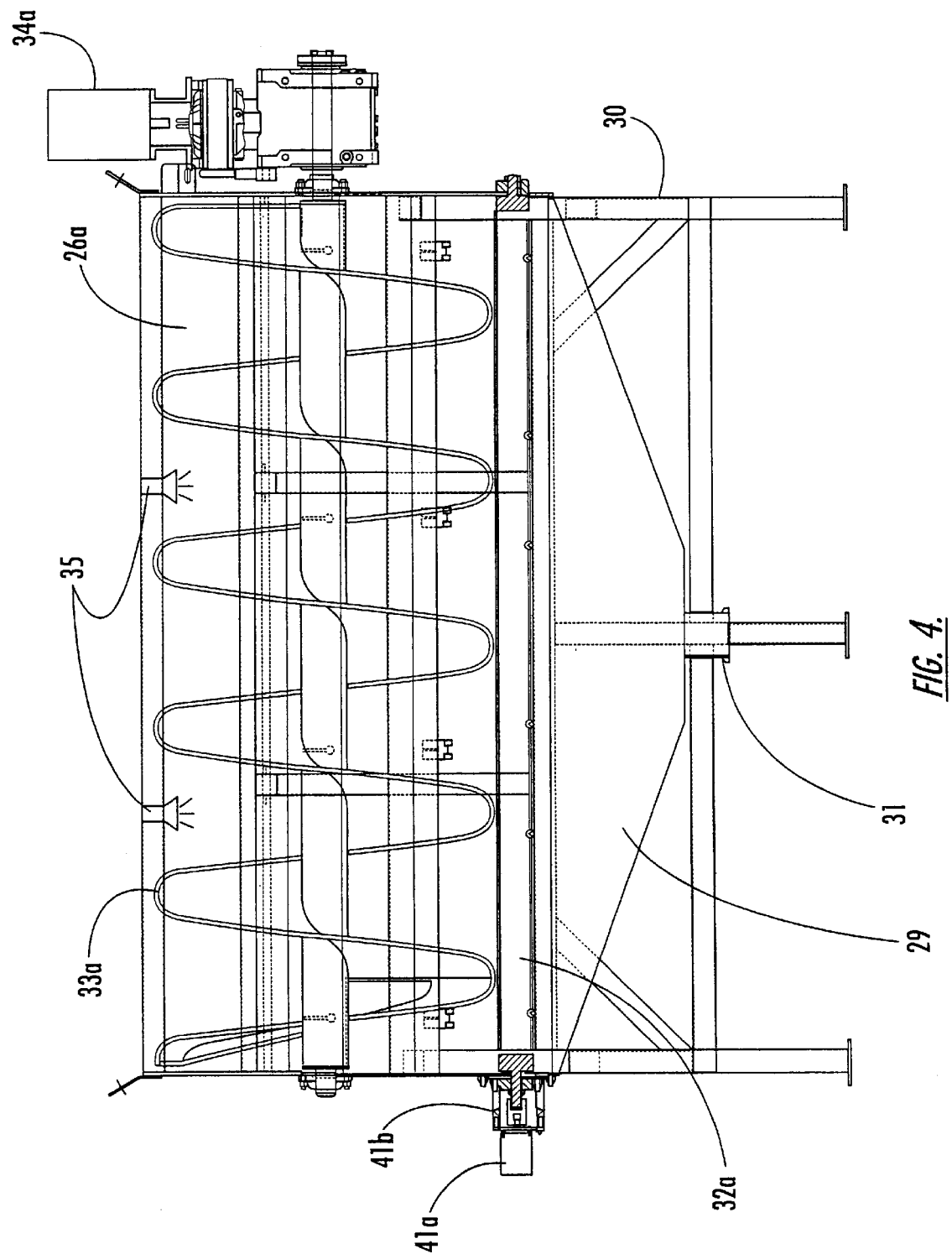
FIG. 4 is a cross-sectional view taken along lines 4—4 of FIG. 3.

The peeling apparatus 20 may include the lower collection pan 29 and the outlet port 31 in communication therewith which define the cleaning solution collection system for the peeling apparatus, and which may be coupled to the common plant cleaning solution collection system 24. Of course, the cleaning solution from the peeling apparatus 20 may also be recycled and used again for cleaning the peeler and/or any of the other processing apparatus 21, 22. Also the cleaning solution from the common plant cleaning solution delivery system 23 may be distributed or sprayed on interior portions of the peeling apparatus 20 using the schematically illustrated nozzles 35 (FIG. 4).

The peeling apparatus 20 illustratively includes two generally horizontally extending, side-by-side peeling chambers 26a, 26b, but many of the features and components thereof may also be used in a single peeling chamber apparatus, and/or in a peeling apparatus arranged at an angle other than horizontal as will be readily appreciated by those skilled in the art. The peeling apparatus 20 is also illustratively fed fruit or vegetables from one or more upstream devices, schematically illustrated in FIG. 1 by the fruit/vegetable supply 27. In addition, the peeling apparatus 20 also includes a controller 28 connected to the various motors and other equipment as will be described in greater detail below.

The peeling apparatus 20 may be used for many peeling operations to be performed typically on fruit or vegetables. For example, the peeling apparatus 20 may be used to extract oil from the peels of citrus fruit as disclosed in parent U.S. patent application Ser. No. 09/576,924 filed on May 23, 2000, the entire disclosure of which is incorporated herein by reference. Of course, the peeling apparatus 20 may be used for peeling potatoes, and other fruit and vegetables as will be appreciated by those skilled in the art.

The peeling apparatus 20 illustratively includes a frame 30 which carries the first and second peeling chambers 26a, 26b in side-by-side relation. The first peeling chamber 26a includes a first set of abrasive rollers 32a and a first auger 33a adjacent thereto. Similarly, the second peeling chamber 26b comprises a second set of abrasive rollers 32b and a second auger 33b adjacent thereto. Each auger 33a, 33b has a respective electric drive motor 34a, 34b connected thereto. Of course, a discharge opening 37a, 37b is provided at the discharge end of each peeling chamber 26a, 26b as shown perhaps best in FIGS. 1 and 4. The discharge openings 37 are illustratively arcuate in shape and offset to the respective outer sides. A common intake opening 39 (FIG. 2) is provided at the intake end to receive the fruit or vegetables therein.

In accordance with one aspect of the peeling apparatus 20, the first and second augers 33a, 33b include respective helical flights oriented in opposite helical directions. The drive motors 34a, 34b drive the first and second augers 33a, 33b in opposite rotational directions. In other words, the drive motors 34a, 34b define a drive for the augers 33a, 33b. The fruit or vegetables in each peeling chamber 26a, 26b is advanced in parallel from the intake to the discharge end of the peeling apparatus 20.

The first set of abrasive rollers 32a are aligned along a first arc, and the second set of abrasive rollers 32b are aligned along a second arc being a mirror image of the first arc. Moreover, the first and second arcs each extend higher along outsides of the peeling apparatus 20. This may be accommodated since rotation of the augers 33a, 33b tends to cause the fruit to ride up toward the outside as will be appreciated by those skilled in the art. This arrangement of rollers provides a number of advantages, particularly in that more rollers are accessible from the exterior of the peeling apparatus 20, rather than being positioned on the less accessible interior as will be appreciated by those skilled in the art.

Another aspect of the peeling apparatus 20 is that the number of abrasive rollers 32a, 32b in each of the first and second sets may be greater than eight. In the illustrated embodiment, twelve rollers are provided in each set. A combined or total number of abrasive rollers 32a, 32b in both of the first and second sets is also preferably greater than sixteen. In the illustrated peeling apparatus 20 the total number of rollers is twenty-four. The larger number of rollers may provide a greater throughput in a smaller machine footprint. Accordingly, the peeling apparatus 20 may be installed or retrofitted into a relatively small space.

Figure 2:
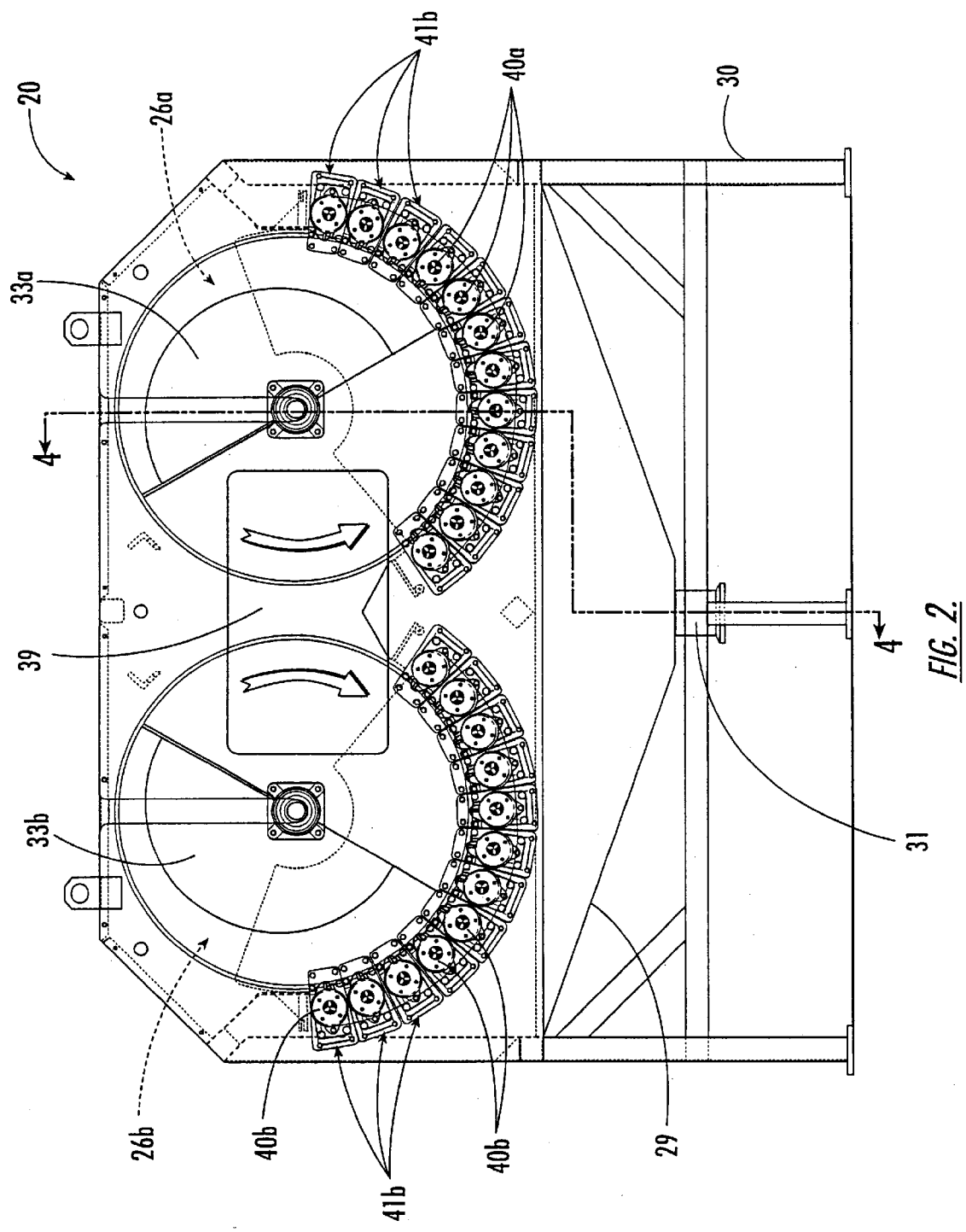
FIG. 2 is an intake end view of the peeling apparatus of FIG. 1.
Figure 3:
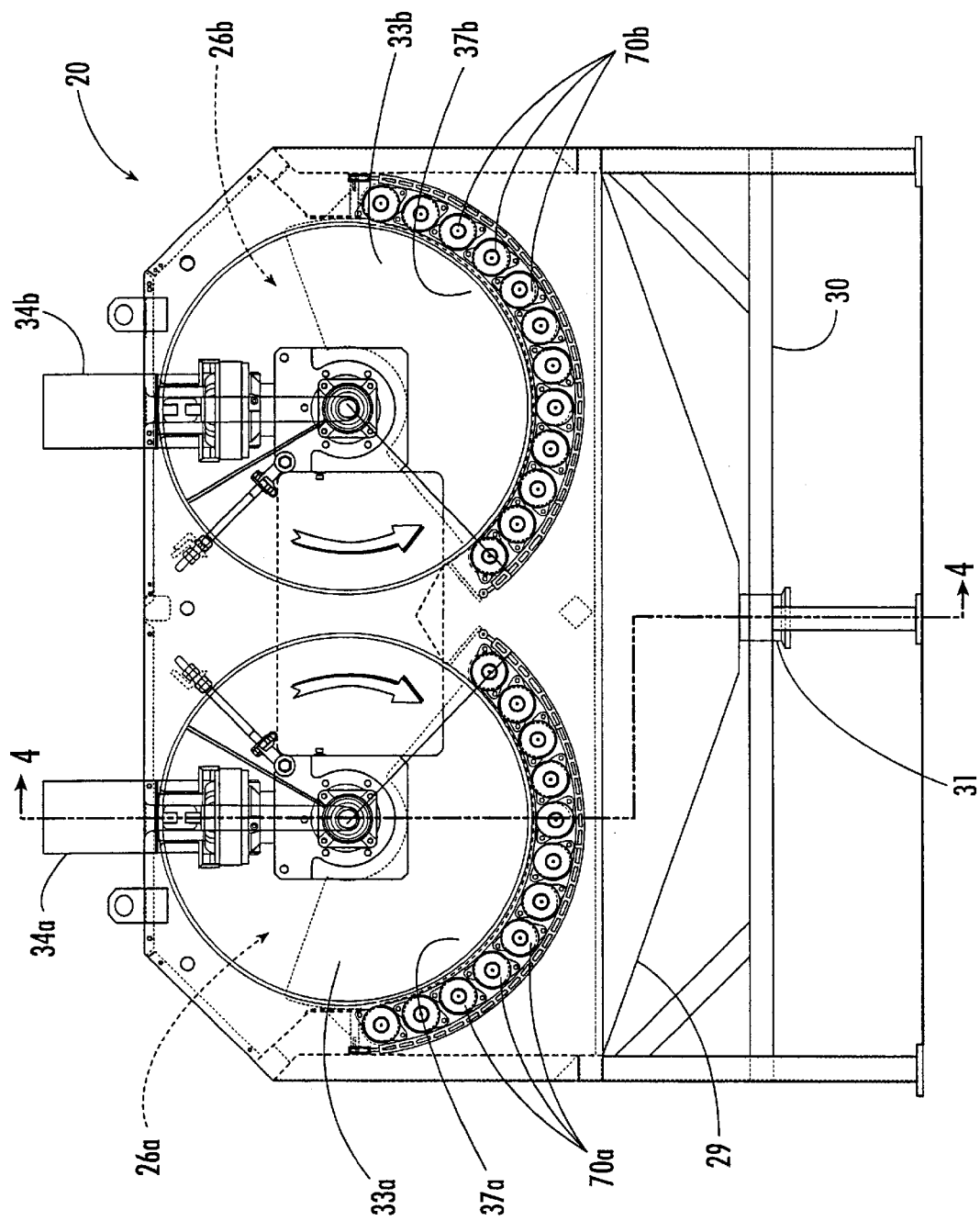
FIG. 3 is a discharge end view of the peeling apparatus of FIG. 1.
Figure 5:
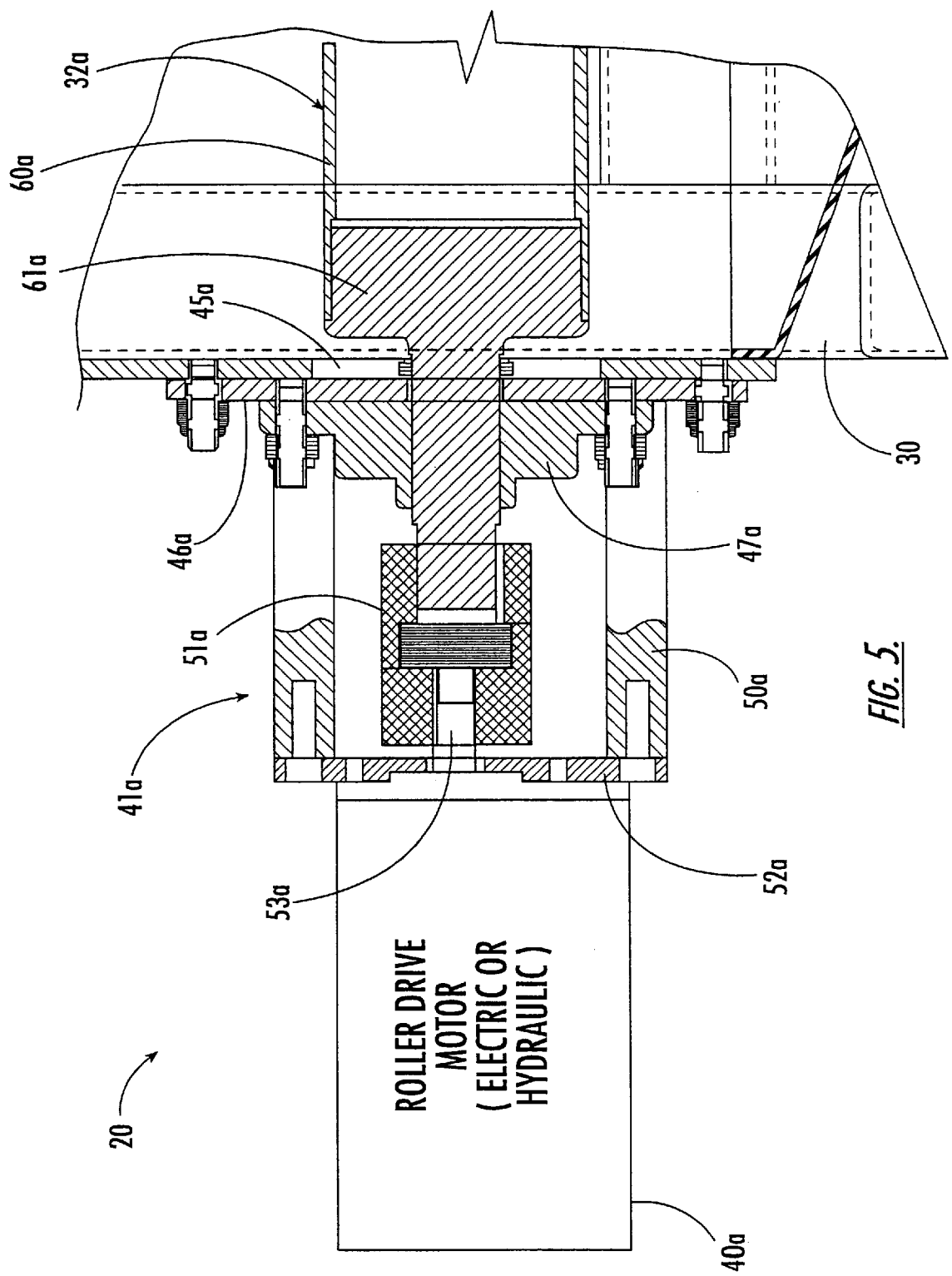
FIG. 5 is an enlarged cross-sectional view of the intake end of an abrasive roller, its flange bearing, removable mount and drive motor as used in the peeling apparatus of FIG. 1.

Referring now more particularly to FIG. 2 and additionally to FIG. 5, other advantageous features of the peeling apparatus 20 are now described. In particular, each peeling chamber 26a, 26b illustratively includes a set of motors 40a, 40b and associated mounts 41a, 41b for the abrasive rollers. These motors 40a, 40b and mounts 41a, 41b are illustratively carried by the intake end, accordingly, the fruit or vegetables can more readily pass out of the discharge openings unencumbered by the motors and mounts as will be appreciated by those skilled in the art.

For clarity of explanation, only a single motor 40a, mount 41a, and intake end of a roller 32a will now be described, although those of skill in the art will appreciate that this configuration may be duplicated for all of the rollers in both peeling chambers 26a, 26b. More particularly, the frame 30 includes a roller opening 45a adjacent the intake end. The roller opening 45a may be an arcuately shaped slotted opening for the set of rollers as in the illustrated embodiment, or individual openings could be provided for each roller as will be appreciated by those skilled in the art. The mount 41a is also connected to the intake end adjacent the roller opening 45a, and this mount carries the intake end of the abrasive roller 32a as well as the motor 40a.

The mount 41a permits the abrasive roller 32a to be installable or removable through the roller opening 45a upon removal of the mount 41a from the frame 30. The mount 41a also permits the roller drive motor 40a to be separately removed, such as for service or replacement.

The abrasive roller 32a illustratively comprises an elongate body portion 60a having an abrasive outer surface as will be described in greater detail below, and an intake mounting stub 61a and a discharge mounting stub 62a (FIG. 7) permanently affixed to respective opposing ends of elongate body portion. Each mounting stub may include a body portion received within an open end of the elongate body portion 60a, and may also include an integrally formed shaft extending outwardly therefrom. Other similar constructions are also possible.

The mounting stubs 61a, 62a are preferably permanently affixed to the ends of the elongate body portion 60a to provide for higher rotational speeds with less vibration and resonance as will be appreciated by those skilled in the art. For example, in those embodiments where the elongate body portion 60a of the abrasive roller 32a comprises metal, such as steel or aluminum, the mounting stubs 61a, 62a may be permanently affixed by welding, although similar techniques are also contemplated by the present invention.

In the illustrated embodiment, the mount 41a illustratively includes a base plate 46a covering overlying the opening 45a and secured to the frame 30. A flange bearing 47a is carried by the base plate 46a and rotatably supports the intake mounting stub 61a at the end of the abrasive roller 32a. The mount 41a also illustratively includes the motor standoff 50a also carried by the base plate 46a and which is coaxial with the end of the mounting stub 61a and output shaft 53a of the motor 40a. The output shaft 53a of the motor 40a is connected to the end of the mounting stub 61a via a flexible coupling 51a which may also permit higher rotational speeds for the abrasive roller 32a by reducing vibration.

The schematically illustrated motor 40a may include an electric or hydraulic actuator directly coupled to the output shaft 53a, or an intervening gearbox may be provided to produce a desired rotational speed of the abrasive roller 32a as will be appreciated by those skilled in the art. The motor 40a is illustratively connected to a motor mounting plate 52a which, in turn, is carried by the end of the motor standoff 50a. Other equivalent mounting arrangements are also contemplated by the invention. In some alternate embodiments, the individual motors may be replaced by a common motor and associated drive train for driving the sets of rollers.

As perhaps best seen with reference to FIG. 2, the mounts 41a, 41b, and, more particularly, the base plates thereof, may have a trapezoidal shape. Accordingly, when the mounts 41a, 41b are arranged in side-by-side relation, the mounts define an arc.

Turning now additionally to FIGS. 6 and 7, another advantageous aspect of the peeling apparatus 20 is described. More particularly, respective sets of flange bearings 70a, 70b are provided at the discharge end of the peeling apparatus for each of the peeling chambers 26a, 26b. Each flange bearing 70a is illustratively provided by a flange bearing having a generally oval footprint with first and second fastener openings adjacent opposing ends of the footprint and which, in turn, receive respective first and second fasteners 72a to secure the flange bearing in place. The flange bearing 70a of the mount 41a rotatably supports the discharge mounting stub 62a of the abrasive roller 32a.

Moreover, as best seen in FIG. 7, each flange bearing 70a with its generally oval footprint may be readily canted at an angle and nested into an adjacent flange bearing. In contrast, pillow block bearings, for example, may be difficult to accurately position and may take up additional space. Accordingly, the flange bearings 70a, 70b of the peeling apparatus 20 provide a very compact arrangement adjacent the discharge openings 37a, 37b so that the fruit or vegetables may be easily discharged therefrom.

Figure 8:
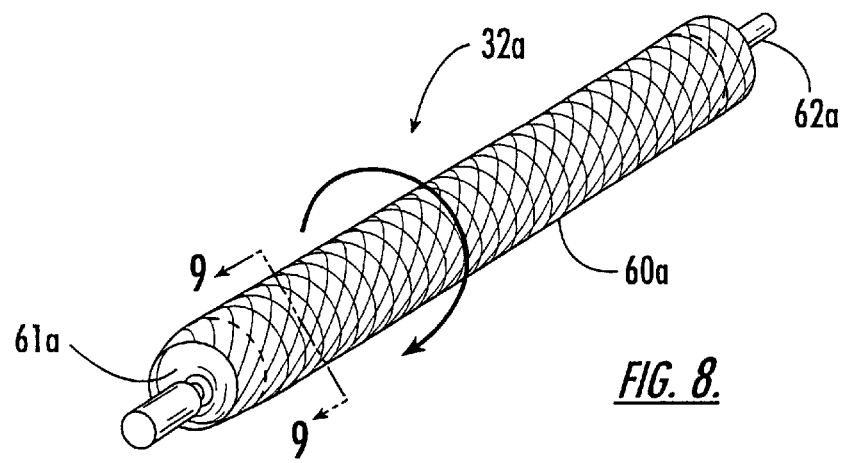
FIG. 8 is a perspective view of an abrasive roller as may be used in the peeling apparatus of FIG. 1.
Figure 9:
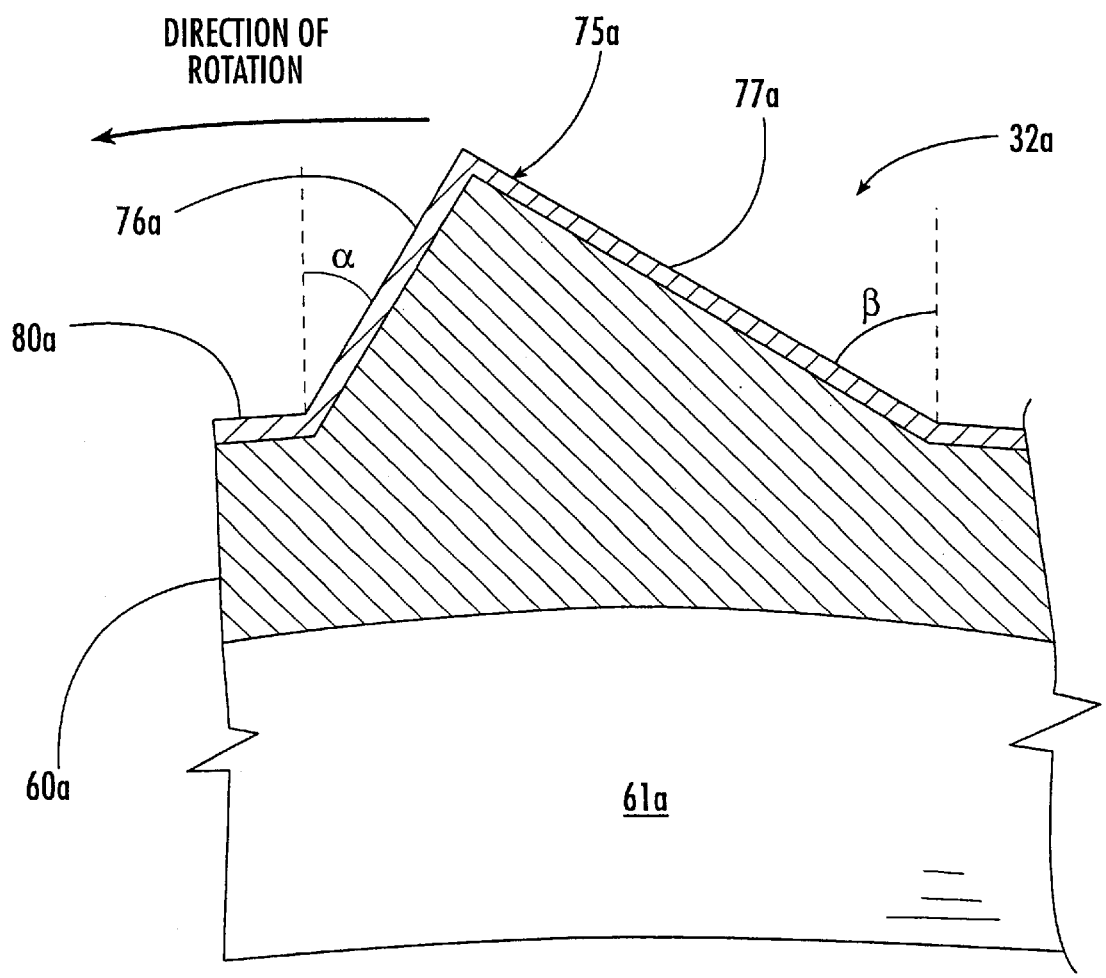
FIG. 9 is a greatly enlarged cross-sectional view taken along lines 9—9 of FIG. 8 illustrating an individual knurl embodiment.

Referring now additionally to FIGS. 8 and 9 other aspects relating to the abrasive roller 32a of the peeling apparatus 20 are further described. The abrasive roller 32a includes an elongate body portion 60a, preferably in the form of an elongate tube to thereby reduce overall weight. The tubular shape may be readily and accurately formed by precision centerless grinding techniques as will be appreciated by those skilled in the art.

Mounting stubs 61a, 62a are preferably welded to opposing ends of the tubular elongate body portion 60a as described above, and an abrasive surface is formed on the outer surface portion of the elongate body portion. The abrasive outer surface may be manufactured by pressing the outer roller surface against a shaping or die surface to form a pattern of knurls, similar to a #10TPI knurl. In other words, the knurls may be integrally formed into the surface of the elongate body portion 60a.

A cross-section of one such knurl 75a is shown in FIG. 9. The illustrated knurl 75a may define a peak height of about 0.050 inches with a tolerance of about +0.00 and −0.020 inches. The abrasive roller 32a may have a diameter of about 3.9 to 4.0 inches, although other sizes are also possible. Moreover, the knurl 75a may have a leading edge portion 76a that is steeper than the adjacent trailing edge portion 77a. For example, the leading edge portion 76a may define an angle α of about a thirty degrees from a line normal to the surface. Also, the trailing edge portion 77a may define an angle β of about sixty degrees from a line normal to the surface. Other angles are also possible. The steeper angle of the leading edge portion 76a may provide an extended wear life, and reduce the need for maintenance. In some embodiments, all of the knurls may have a same shape, although other embodiments may benefit from different shaped knurls.

To further provide increased wear resistance for the knurl 75a a wear-resistant surface coating 80a may be applied to cover the base metal of the elongate body portion 60a. For example, the elongate body portion 60a may comprise steel or aluminum, and the surface coating 80a may comprise cobalt, chromium, tungsten, nickel, or alloys thereof. For example, Stellite® may be used as the coating 80a and it is an alloy family containing cobalt, chromium, tungsten and other elements as will be readily appreciated by those skilled in the art.

In other embodiments, the base metal of the abrasive roller 32a may not require a coating. For example, stainless steel may not require a protective coating. To reduce overall costs, in one preferred embodiment, a mild steel base metal may be combined with the protective coating 80a as will be appreciated by those skilled in the art.

Figure 10:
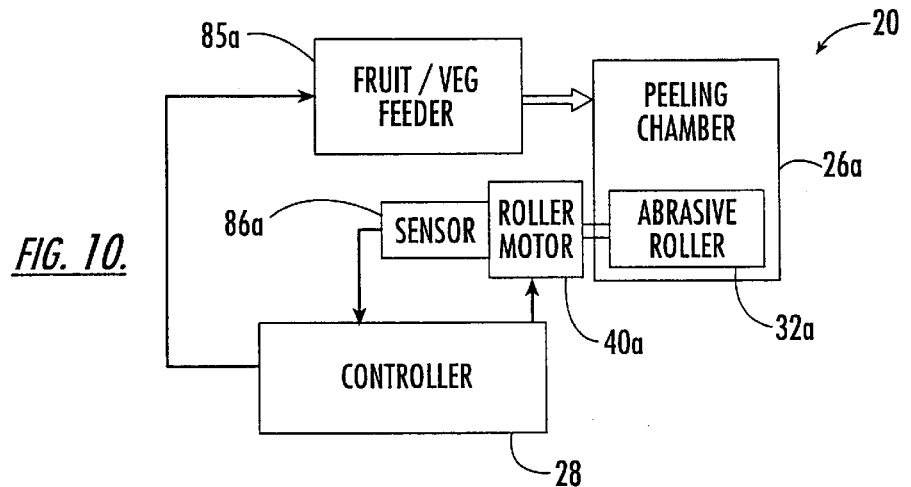
FIG. 10 is a schematic diagram of a control aspect of the peeling apparatus shown in FIG. 1.
Figure 11:
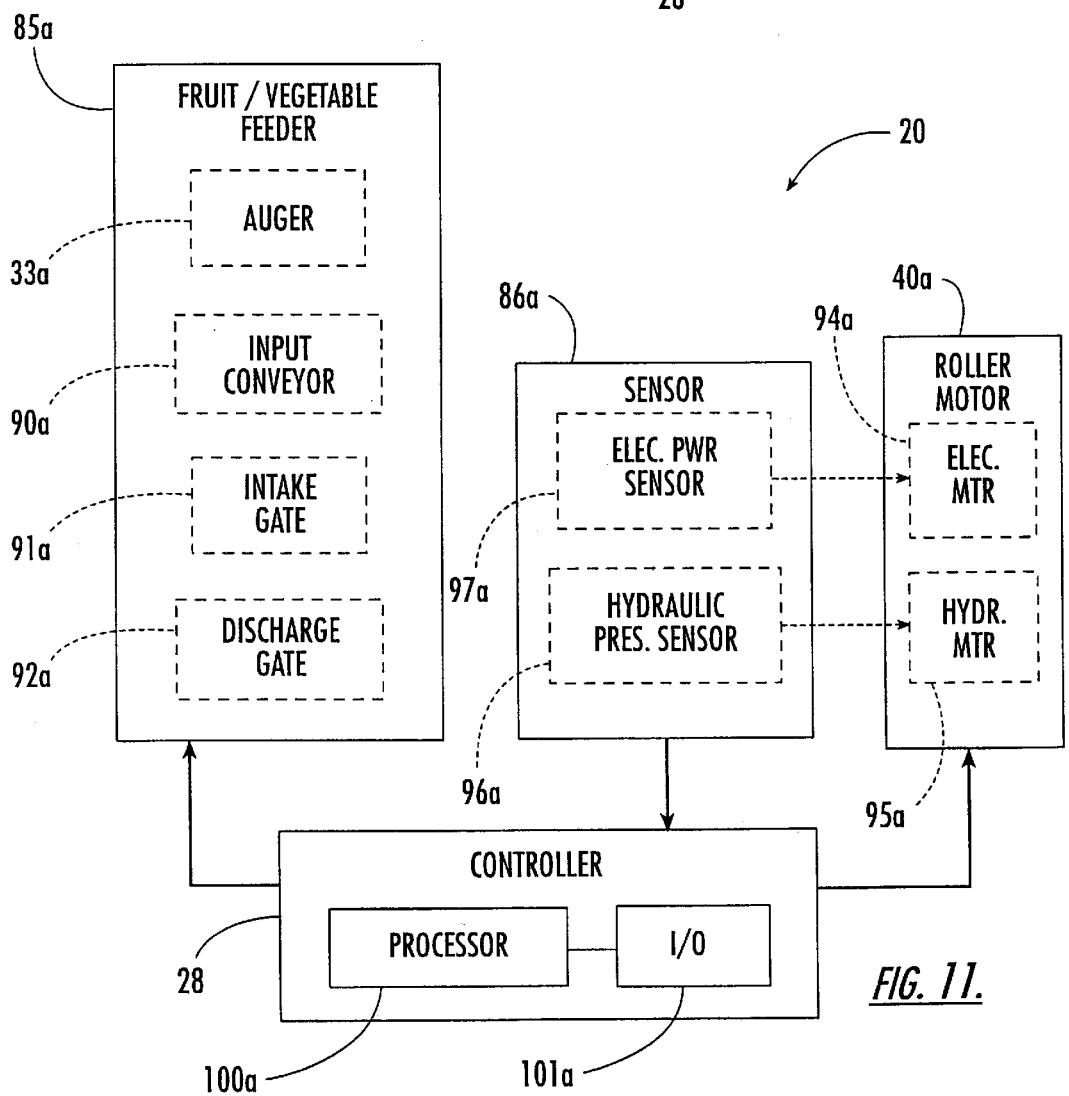
FIG. 11 is a schematic diagram of another control aspect of the peeling apparatus shown in FIG. 1.

Turning now additionally to the schematic diagrams of FIGS. 10–11, various control aspects of the peeling apparatus 20 are now described. In particular, the peeling apparatus 20 includes a set of abrasive rollers 32a arranged to define a peeling chamber 26a, and roller drive motors 40a as explained in detail above. A feeder 85a is provided for controllably feeding fruit or vegetables adjacent the abrasive rollers. A sensor 86a is associated with at least one roller drive motor 40a for sensing a load thereon. For example, the sensor 86a may be associated with one or more lower rollers to more accurately sense the load, although sensors may be provided for all of the motors as will be appreciated by those skilled in the art. The controller 28 is illustratively connected to the sensor 86a and feeder 85a for controlling the feeder based upon the sensor. Accordingly, the feeder 85a can be controlled based upon the sensed load on the abrasive roller 32a.

For example, for typical operation, the controller 28 may increase the feed rate of the feeder 85a based upon an increase in sensed load, and conversely decrease the feed rate based upon a decrease in sensed load. In some embodiments, the controller 28 may also control one more of the roller drive motors 40a based upon the sensed load. This aspect of the peeling apparatus 20 provides a relatively straightforward, robust and cost effective approach to control important peeling parameters.

As understood with particular reference to FIG. 11, the feeder 85a may comprise an input conveyor 90a upstream of the set of abrasive rollers. In addition to or in place of the input conveyor 90a, the feeder may include the auger 33a adjacent the set of abrasive rollers. Also, the feeder 85a may include at least one of an intake gate 91a and a discharge gate 92a, and with or without the input conveyor and/or auger. Those of skill in the art will recognize other feeder configurations that are controllable in accordance with this aspect of the peeling apparatus 20.

The sensor 86a may comprise a torque sensor for sensing a torque delivered by the roller drive motor 40a. In one class of embodiments, the roller drive motor 40a may be a hydraulic motor 95a, and the sensor 86a may be a hydraulic pressure sensor 96a. In one particularly advantageous class of embodiments, the roller drive motor 40a may comprise a roller drive electric motor 94a. Accordingly, for this class of embodiments, the torque sensor may thus comprise an electrical power sensor 97a.

The controller 28 itself may include a processor 100a and various input/output devices 101a connected thereto. For example, the input/output devices 101a may include an operator CRT display or other indicators, as well as a keyboard or other input devices as will be appreciated by those skilled in the art. Of course, the controller 28 may provide a range of from full automatic to full manual control as will also be appreciated by those skilled in the art. In addition, other features relating to the apparatus and method for peeling vegetables and fruit are disclosed in copending patent applications filed concurrently herewith and assigned to the assignee of the present invention and are entitled PEELING APPARATUS AND ASSOCIATED METHODS, Ser. No. 09/842,356 and PEELING APPARATUS WITH ENHANCED ABRASIVE ROLLERS AND ASSOCIATED METHODS, Ser. No. 09/842,368 the entire disclosures of which are incorporated herein in their entirety by reference.

Many modifications and other embodiments of the invention will come to the mind of one skilled in the art having the benefit of the teachings presented in the foregoing descriptions and the associated drawings. Accordingly, it is understood that the invention is not to be limited to the embodiments disclosed, and that other modifications and embodiments are intended to be included within the spirit and scope of the appended claims.

That which is claimed is:

1. A peeling apparatus comprising:
   a frame; and
   at least one set of abrasive rollers carried by said frame to define at least one peeling chamber;
   at least one abrasive roller of said at least one set thereof comprising an elongate body portion having an abrasive outer surface, and a pair of mounting stubs permanently affixed to respective opposing ends of said elongate body portion and rotating therewith.

2. A peeling apparatus according to claim 1 wherein said elongate body portion and said pair of mounting stubs each comprises metal; and wherein said pair of mounting stubs are welded to respective ends of said elongate body portion.

3. A peeling apparatus according to claim 1 wherein said elongate body portion has a tubular shape.

4. A peeling apparatus according to claim 1 wherein said abrasive outer surface comprises a plurality of knurls arranged in a pattern.

5. A peeling apparatus according to claim 4 wherein at least some of said knurls comprise a leading edge portion being steeper than a trailing edge portion.

6. A peeling apparatus according to claim 4 wherein at least some of said knurls have a substantially same shape.

7. A peeling apparatus according to claim 4 wherein said plurality of knurls are integrally formed with said elongate body portion.

8. A peeling apparatus according to claim 4 further comprising a surface coating over the plurality of knurls.

9. A peeling apparatus according to claim 8 wherein said surface coating comprises at least one of cobalt, chromium, tungsten, and nickel.

10. A peeling apparatus according to claim 8 wherein said elongate body portion comprises at least one of steel and aluminum.

11. A peeling apparatus according to claim 1 further comprising at least one auger adjacent said at least one set of abrasive rollers.

12. A peeling apparatus comprising:

a frame; and at least one set of abrasive rollers carried by said frame to define at least one peeling chamber;

at least one abrasive roller of said at least one set thereof comprising an elongate body portion and a plurality of knurls arranged thereon in a pattern defining an abrasive outer surface, said at least one abrasive roller comprising at least one of steel and aluminum and an outer coating thereon comprising at least one of cobalt, chromium, tungsten, and nickel.

13. A peeling apparatus according to claim 12 wherein said elongate body portion has a tubular shape.

14. A peeling apparatus according to claim 12 wherein at least some of said knurls comprise a leading edge portion being steeper than a trailing edge portion.

15. A peeling apparatus according to claim 12 wherein at least some of said knurls have a substantially same shape.

16. A peeling apparatus according to claim 12 wherein said plurality of knurls are integrally formed with said elongate body portion.

17. A peeling apparatus according to claim 12 further comprising at least one auger adjacent said at least one set of abrasive rollers.

18. A peeling apparatus comprising:

a frame; and at least one set of abrasive rollers carried by said frame to define at least one peeling chamber;

at least some of said abrasive roller of said at least one set of abrasive rollers comprising an elongate body portion and a plurality of knurls arranged thereon in a pattern defining an abrasive outer surface, at least some of said knurls comprising a leading edge portion being steeper than a trailing edge portion.

19. A peeling apparatus according to claim 18 wherein said elongate body portion has a tubular shape.

20. A peeling apparatus according to claim 18 wherein at least some of said knurls have a substantially same shape.

21. A peeling apparatus according to claim 18 wherein said plurality of knurls are integrally formed with said elongate body portion.

22. A peeling apparatus according to claim 18 further comprising a surface coating over the plurality of knurls.

23. A peeling apparatus according to claim 22 wherein said surface coating comprises at least one of cobalt, chromium, tungsten, and nickel.

* * * * *